United States Patent [19]
Nylund

[11] 4,348,355
[45] Sep. 7, 1982

[54] FUEL ASSEMBLY FOR A BOILING NUCLEAR REACTOR
[75] Inventor: Olov Nylund, Västerås, Sweden
[73] Assignee: AB Asea-Atom, Västerås, Sweden
[21] Appl. No.: 158,616
[22] Filed: Jun. 11, 1980
[30] Foreign Application Priority Data
  Jul. 3, 1979 [SE] Sweden .................................. 7905800
[51] Int. Cl.³ ................................................ G21C 3/32
[52] U.S. Cl. ................................. 376/434; 376/440; 376/447; 376/448
[58] Field of Search ................... 176/76, 78; 376/434, 376/447, 440, 448
[56] References Cited
U.S. PATENT DOCUMENTS
  3,158,549  11/1964  Fowler .................................. 176/78
  3,697,375  10/1972  Suvanto ............................... 176/78
  3,808,098   4/1974  Fredin .................................. 176/78

Primary Examiner—Donald P. Walsh
Attorney, Agent, or Firm—Watson, Cole, Grindle & Watson

[57] ABSTRACT

A fuel assembly for the core of a boiling water nuclear reactor has a plurality of boxes each surrounding a respective bundle of fuel rods. These boxes, are connected at one end to a common bottom unit, intended to be connected to an opening in a supporting plate in the core, and are also connected at their other end to a common top unit. The boxes may be detachably connected to the bottom portion and the top unit and be relocatable within the fuel assembly. Alternatively, the bundles of rods may be arranged for easy withdrawal from the boxes to enable transfer of the rod bundles between the boxes.

9 Claims, 3 Drawing Figures

FUEL ASSEMBLY FOR A BOILING NUCLEAR REACTOR

TECHNICAL FIELD

This invention relates to a fuel assembly for the core of a boiling water nuclear reactor.

PRIOR ART

The most common fuel assembly used today in boiling water nuclear reactor cores comprises a fuel rod bundle with sixty-four elongated fuel rods enclosed in an elongated box of square cross-section which, in use of the fuel assembly, has its longitudinal axis substantially vertical and controls the flow of cooling water past the fuel rods. The fuel rods consist of fuel pellets in sheathing tubes, and the box of the assembly has a bottom portion, intended to be connected to an opening in a supporting plate in the core, and a top portion, intended to support against a grid in the core. Fuel assemblies of this kind are described in more detail in, for example, U.S. Pat. No. 3,697,375.

In use of these known fuel assemblies, because of the flow resistance in the box, the cooling water has to be forced under pressure through the box along the bundle of fuel rods. Consequently, an internal overpressure exists, which gives rise to a bending stress in the plane sides of the box. Because of this bending stress at elevated temperature and simultaneous neutron radiation, an inconvenient permanent deformation may arise. To be able to restrict this deformation to within reasonable limits, thick metallic sheet material must be used for the box. In a box for an assembly of sixty-four fuel rods, the thickness of the metallic sheet material is usually about 3 mm. The large cross-section of the fuel bundle results in a variation of the neutron flux because this varies with the steam content of the cooling water, so that the neutron flux becomes lowest at the centre of the cross-section.

One aim of the present invention is to provide a fuel assembly having a more even neutron flux over the cross-section of a fuel rod bundle so that a more even power distribution and burn-up may be obtained, thus making it possible to use fuel with substantially the same degree of enrichment in all the fuel rods within a fuel rod bundle. Another aim is to reduce the amount of constructional material in the boxes which surround the fuel rod bundles, thus reducing the amount of neutron-absorbing material in the core. The fuel assembly according to the invention may be used in existing reactor cores, which is particularly valuable, and it offers the possibility of reducing the fuel cost and facilitates the administration and the handling of fuel rods, since fuel of only one degree of enrichment, or fewer degrees of enrichment than previously, need be used.

DISCLOSURE OF INVENTION

According to the invention, a fuel assembly for the core of a nuclear reactor comprises a plurality of elongated boxes, each surrounding a respective bundle of elongated fuel rods, and first and second end portions receiving opposite ends respectively of the plurality of boxes and holding the boxes in substantially parallel spaced relationship, which end portions are intended to be supported in the core.

In a fuel assembly in accordance with the invention, the boxes may be detachably joined to the first and second end portions. It is then possible to rearrange the boxes, together with their fuel rod bundles, within the fuel assembly, or to rotate the boxes with their fuel rod bundles, but allow the boxes to maintain their positions within the fuel assembly. Alternatively, the fuel assembly may be constructed with the boxes fixedly connected to the first and second end portions, but with the fuel rod bundles withdrawable from the boxes to enable rearrangement within the fuel assembly. From the point of view of strength, it may be suitable to make the boxes with corners of large radius. Fuel rods having a smaller diameter than the other rods in the bundle are then suitably inserted in the corner positions. A further possibility of improving the moderating effect, so as to achieve a more even neutron flux and power development within the fuel rod bundles, is to replace a fuel rod at the inner part of a fuel rod bundle with an empty fuel rod tube with free through-flow for cooling and moderator water. To prevent oscillations or vibrations, the boxes of the fuel assembly may be connected to a connecting element at one or more places between the first and second end portions.

BRIEF DESCRIPTION OF DRAWINGS

The invention will now be described, by way of example, with reference to the accompanying drawings, in which.

DESCRIPTION OF PREFERRED EMBODIMENT

In the Figures, the numeral 1 designates cruciform control rods. Between a group of four of these control rods there is arranged a group of four fuel assemblies 2. Each fuel assembly comprises four boxes 2a, 2b, 2c and 2d of square cross-section, each of these boxes containing a respective bundle of fuel rods 3. These fuel rods comprise fuel pellets in sheathing tubes.

Figure 3:
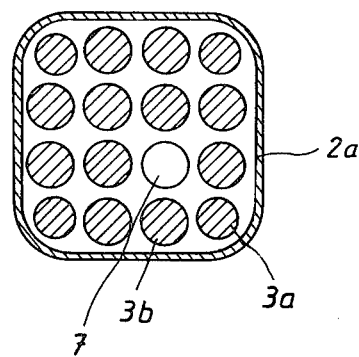
FIG. 3 is a sectional view, on an enlarged scale, through a box with one fuel rod bundle.

The boxes 2a–2d of the fuel assembly are connected at the bottom to a common bottom portion 4, which is connected to an assembly supporting plate of the core and distributes the cooling water to the four boxes of the assembly. At the top, the boxes are connected to a common top portion or unit 5. Between the bottom portion 4 and the top unit 5, the boxes 2a–2d may be connected to each other in one or more places by means of connecting elements 6. As shown in FIG. 3, which shows one of the boxes (box 2a), it can be seen that each of the boxes 2a–2d may be formed with corners of large radius and the four fuel rods 3a adjacent the corners of a box may be of smaller diameter than the other fuel rods 3b.

By employing a fuel assembly with four boxes 2a–2d having a common bottom portion 4 and a common top unit 5, it is possible to improve the fuel economy of both new reactors and reactors already in operation. Previously known and tested devices may be employed for supporting the fuel assemblies.

Figure 1:
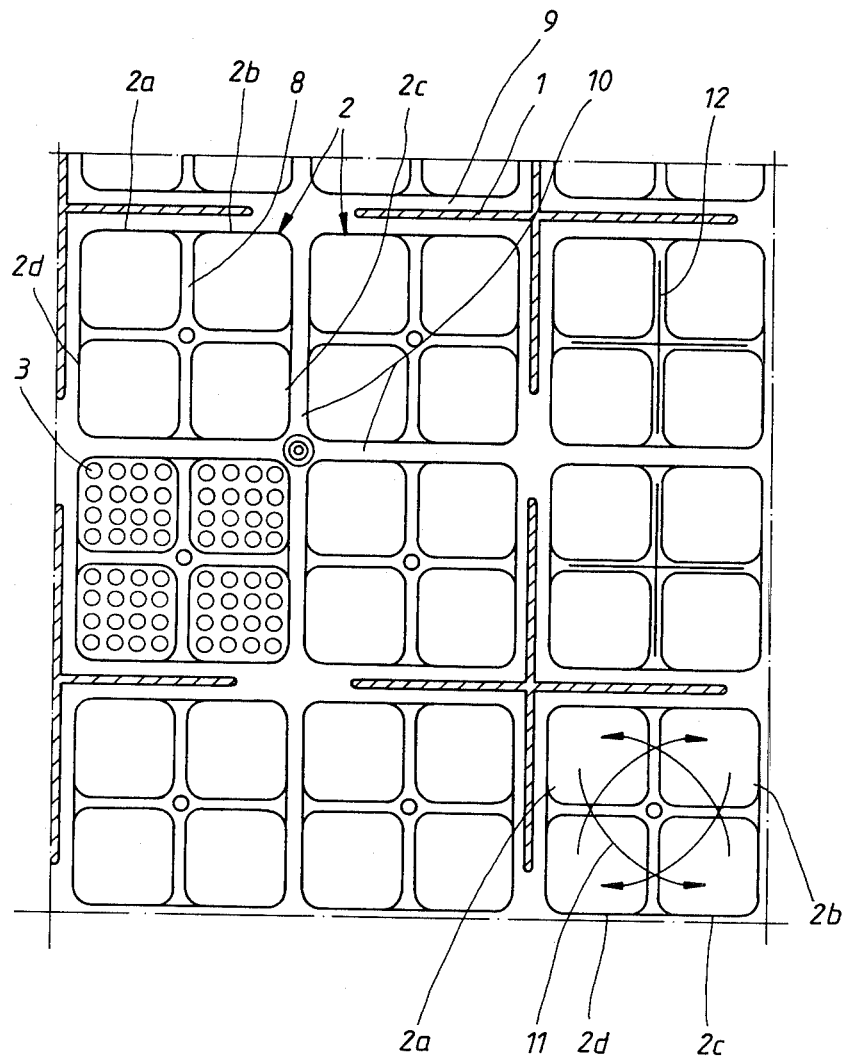
FIG. 1 is a sectional view through a number of fuel assemblies according to the invention in a reactor core.
Figure 2:
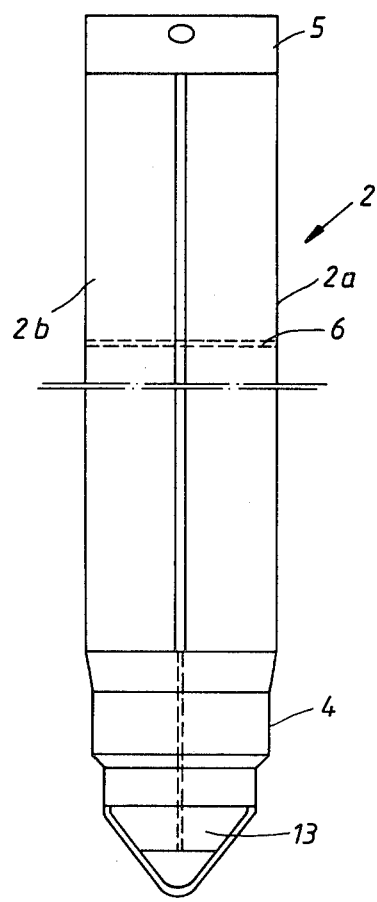
FIG. 2 is a side view of one of the fuel assemblies of FIG. 1.

Because of the cruciform gap 8 between the four boxes 2a–2d of a fuel assembly, a steam-free quantity of water is obtained which results in an increased moderating ability, and thus in a more even neutron flux over the cross-section of the fuel assembly, as well as a more even power developement and burn-up. The need to vary the degree of fuel enrichment within the fuel rod bundle is reduced or eliminated. Since the gaps 9 and 10 between two adjacent fuel assemblies 2 are larger than the gap 8 between the boxes 2a–2d, the neutron flux is somewhat greater nearest the gaps 9 and 10, and thus also the power development. By re-arrangement of the boxes containing the fuel rods or transfer of fuel rod bundles between boxes, as shown by the arrows 11 in FIG. 1, an uneven burn-up may be prevented. As shown, the boxes 2a and 2c change positions and the boxes 2b and 2d change positions. One further possibility of achieving an equalization of the neutron flux, the power development and the burn-up is to replace a fuel rod with an empty tube 7 (see FIG. 3) through which the cooling water and the moderator water pass freely. A rod may be placed in the centre of the fuel assembly, which rod connects and retains the bottom portion 4 and the top unit 5 of the fuel assembly. In a design of a fuel assembly in which the four boxes of the assembly are connected to each other, the fuel assembly may comprise a cruciform temporary absorber rod 12 or individual absorber plates with a burnable absorber which may be removed after a certain time in connection with fuel transfer or refuelling. The bottom portion of the fuel assembly is preferably formed with a cruciform divider 13 which extends down into or through a throttle opening in the bottom portion 4 and the core bottom orifice. The bottom portion 4 is thus divided into four throttled channels, which ensures that the water volume through the four boxes becomes equal and stable even if the flow resistance in the boxes should be different.

By the division of a fuel assembly box into four smaller ones, a larger box surface is obtained. However, because the dimensions are smaller, the bending stresses will be reduced to such an extent that the thickness of the metallic sheet material from which the boxes are made may be reduced by more than 50 percent. The amount of box material is considerably reduced, and thus also the undesired neutron absorption. At the same time, a larger space is obtained for a steam-free water volume and a more even distribution thereof.

What is claimed is:

1. A fuel assembly for use in the core of a nuclear reactor, said fuel assembly comprising
a plurality of separate elongated box-forming means,
a bundle of elongated fuel rods positioned in each elongated box-forming means, and
separate spaced-apart first and second end members which mount the respective opposite ends of all of said box-forming means such that they are spaced apart from one another and oriented in parallel, said first and second end members being supportable in said core.

2. A fuel assembly according to claim 1 wherein each of said box-forming means has a generally square cross section with arcuate-shaped corners.

3. A fuel assembly according to claim 2 wherein the bundle of elongated fuel rods in each elongated box-forming means has a square cross section, and wherein the fuel rods at the corners of each bundle have a smaller diameter than the other fuel rods in the bundle.

4. A fuel assembly according to claim 3 wherein each bundle of elongated fuel rods includes a hollow tube through which cooling and moderator water can be freely passed.

5. A fuel assembly according to claim 2 wherein means are provided along the length of said box-forming means to connect them together.

6. A fuel assembly according to claim 1 wherein said fuel assembly includes only four elongated box-forming means.

7. A fuel assembly according to claim 6 wherein a removable absorber rod with a burnable absorber is positioned in the spaces between the four elongated box-forming means.

8. A fuel assembly according to claim 1 wherein one of said first and second end members associated with each box-forming means includes a divider to define a plurality of parallel channels in the associated end member.

9. A fuel assembly according to claim 1 wherein each of said elongated box-forming means is disconnectable from the associated first and second end members and each of said bundles of elongated fuel rods is removable from within the associated box-forming means.

* * * * *